US009918265B2

(12) United States Patent
Eriksson et al.

(10) Patent No.: US 9,918,265 B2
(45) Date of Patent: Mar. 13, 2018

(54) METHOD AND APPARATUS FOR TRANSFERRING RADIO SERVICE BETWEEN TRANSMISSION POINTS IN A WIRELESS COMMUNICATION SERVICE

(71) Applicant: Telefonaktiebolaget L M Ericsson (publ), Stockholm (SE)

(72) Inventors: Erik Eriksson, Linköping (SE); Joel Berglund, Linköping (SE); Päl Frenger, Linköping (SE); Martin Hessler, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 207 days.

(21) Appl. No.: 14/419,844

(22) PCT Filed: Jan. 16, 2015

(86) PCT No.: PCT/SE2015/050036
§ 371 (c)(1),
(2) Date: Feb. 5, 2015

(87) PCT Pub. No.: WO2016/114697
PCT Pub. Date: Jul. 21, 2016

(65) Prior Publication Data
US 2016/0212670 A1 Jul. 21, 2016

(51) Int. Cl.
*H04W 36/20* (2009.01)
*H04L 5/00* (2006.01)
(Continued)

(52) U.S. Cl.
CPC ........... *H04W 36/20* (2013.01); *H04L 5/0048* (2013.01); *H04W 24/02* (2013.01); *H04W 36/0061* (2013.01); *H04W 36/08* (2013.01)

(58) Field of Classification Search
CPC ................................. H04W 36/0005–36/0055
See application file for complete search history.

(56) References Cited

U.S. PATENT DOCUMENTS 8,107,961 B1 * 1/2012 Vargantwar ....... H04W 36/0083 370/331
2009/0061878 A1 * 3/2009 Fischer .................. G08C 17/02 455/436

(Continued)

FOREIGN PATENT DOCUMENTS

EP 1855434 A1 11/2007

OTHER PUBLICATIONS

Razavi, Rouzbeh et al., “A New Approach for Scrambling and Spreading Code Reuse in WCDMA Networks”, Globecom 2013 Workshop—The 5th IEEE International Workshop on Management of Emerging Networks and Services, Atlanta, Georgia, USA, Dec. 9-13, 2013, pp. 986-990.

*Primary Examiner* — Pao Sinkantarakorn
*Assistant Examiner* — Kabir Jahangir
(74) *Attorney, Agent, or Firm* — Murphy, Bilak & Homiller, PLLC

(57) ABSTRACT

One aspect of the teachings herein involves the temporary transfer of radio identities from one service area of a wireless communication network to another service area, where the individual radio identities are used to differentiate individual radio connections between the network and respective wireless nodes supported by the network. In particular, the temporary transfer of a given radio identity from its default service area for use in another service is limited temporally and/or geographically. Limiting the temporal and/or geographic scope of the radio identity transfer allows the network to substantially maintain default associations of radio identities and their respective service areas, which allows the network to prevent or reduce the use of (Continued)

conflicting radio identities in the same service area. Transfer signaling may be used transfer radio identities, and such signaling may include the temporal and/or geographic restrictions, to control the migration or spread of borrowed identities in the network.

33 Claims, 10 Drawing Sheets

(51) Int. Cl.

| | |
|---|---|
| ***H04W 36/00*** | (2009.01) |
| ***H04W 36/08*** | (2009.01) |
| ***H04W 24/02*** | (2009.01) |

(56) References Cited

U.S. PATENT DOCUMENTS

2009/0141685 A1* 6/2009 Berglund .......... H04W 36/0055 370/331
2009/0196254 A1* 8/2009 Cha ....................... H04W 36/30 370/331
2010/0113033 A1* 5/2010 Qiu ................... H04W 36/0055 455/438
2012/0236776 A1* 9/2012 Zhang ................... H04W 48/12 370/312
2013/0155981 A1* 6/2013 Kitazoe ................... H04W 8/26 370/329
2014/0004863 A1* 1/2014 Zhang ............... H04W 36/0033 455/444
2015/0071248 A1* 3/2015 Faerber ............. H04W 36/0055 370/331

* cited by examiner

METHOD AND APPARATUS FOR TRANSFERRING RADIO SERVICE BETWEEN TRANSMISSION POINTS IN A WIRELESS COMMUNICATION SERVICE

TECHNICAL FIELD

The present invention generally relates to wireless communication networks, and particularly relates to networks having multiple transmission points.

BACKGROUND

Mobility management represents a key and continuing challenge in mobile communication networks, such as cellular communication networks based on Long Term Evolution, LTE, or other Third Generation Partnership Project, 3GPP, standards. As a general proposition, a particular radio node or nodes in a cellular network operate as "serving" nodes with respect to a given mobile node that is active and operating in the network. Serving node updates are often referred to as "handovers", whereby a mobile node is "handed over" from its current serving node to a newly designated serving node. These updates correspond to movement of the mobile node within the various coverage areas of the network, and, possibly, changing interference conditions, changing cell loads, etc.

In a known approach, the network identifies a neighbor set of radio nodes in relation to the serving node of a mobile node, and monitors reported signal quality or other relevant measurements made by the device with respect to the serving radio node and its neighbors. Depending on the relative signal qualities, the network may initiate a handover of the mobile device from its current serving node to a neighboring node. Handover initiation generally involves signaling to the involved mobile node, as well as signaling between the involved radio nodes.

During handover, the mobile node disconnects from the serving radio node and connects to the new radio node targeted by the handover. As a reflection of their respective roles, the current serving node in the network often is referred to as the "source" node, while the newly designated serving node is labeled as the "target" node. The reconnection process often involves new radio configurations reflecting new or updated resource assignments between the target radio node and the incoming mobile node.

One of the challenges associated with handover processing is that these procedures often take place at or near cell boundaries, where the mobile node may experience reduced signal with respect to either or both the source and target radio nodes. In some respects, however, newer radio technologies and the associated functionality of the networks incorporating them have morphed the handover concept from one in which the mobile node is viewed as moving from one serving cell to another, to one in which the serving "cell" is moved. This notion holds only for corresponding definitions of what is meant by a "cell" and, in this context, a "cell" may be understood as a node-specific radio link or connection used for a particular mobile node, such as may be identified or defined via the use of particular radio identities. However, it is recognized herein that no effective mechanisms for managing or controlling such "cell" movements have been proposed.

In a non-limiting example, the data connection or transmissions between the network and a mobile node may be scrambled, weighted, coded, or otherwise structured using a DeModulation Reference Signal or "DMRS" that is specifically assigned to the mobile node. Device-specific DMRSs are a type of radio identity that are prominently feature in newer radio technologies, as they provide a basis for serving more mobile nodes or users at the same time, e.g., by using different DMRSs for different users operating in the same cell(s). However, with a finite number of DMRS sequences being available, and in view of the interference problems that arise when the same DMRS sequences are concurrently used within the same coverage area for different data transmissions, it is recognized herein that mobility management becomes, if anything, more challenging with the increasing sophistication of the involved networks and the movement towards device-specific definitions of cells.

SUMMARY

One aspect of the teachings herein involves the temporary transfer of radio identities from one service area of a wireless communication network to another service area, where the individual radio identities are used to differentiate individual radio connections between the network and respective wireless nodes supported by the network. In particular, the temporary transfer of a given radio identity from its default service area for use in another service is limited temporally and/or geographically. Limiting the temporal and/or geographic scope of the radio identity transfer allows the network to substantially maintain default associations of radio identities and their respective service areas, which allows the network to prevent or reduce the use of conflicting radio identities in the same service area. Transfer signaling may be used transfer radio identities, and such signaling may include the temporal and/or geographic restrictions, to control the migration or spread of borrowed identities in the network.

One embodiment involves a method of radio resource management in a wireless communication network, in which radio identities allocable by the network from a finite set of radio identities are used for differentiating individual radio connections with respective wireless nodes. The method is implemented by a network node in the network and, in an example implementation, includes assigning a first radio identity that is associated with a first service area in the network to a first wireless node, for operation in the first service area. The method further includes transferring use of the first radio identity from the first service area to a second service area, so as to continue the radio connection with the first wireless node in conjunction with the first wireless node moving from the first service area to the second service area, and deferring any new assignment of the first radio identity within the first service area until termination of a lending period governing the transfer of the first radio identity.

A related example embodiment involves a network node configured to operate in a wireless communication network, in which radio identities allocable by the network from a finite set of radio identities are used for differentiating individual radio connections with respective wireless nodes. The example network node includes a communication interface configured for exchanging signaling with one or more radio network nodes in the network, for transferring radio identities between respective service areas of the network. Further, the network node includes a processing circuit that is operatively associated with the communication interface and configured to assign a first radio identity that is associated with a first service area in the network to a first wireless node, for operation in the first service area. The processing circuit is further configured to transfer use of the first radio identity from the first service area to a second service area, so as to continue the radio connection with the first wireless node in conjunction with the first wireless node moving from the first service area to the second service area. Complementing these features, the processing circuit is configured to defer any new use of the first radio identity within the first service area until termination of a lending period governing the transfer of the first radio identity.

Another embodiment also involves a method of radio resource management in a wireless communication network, in which radio identities allocable by the network from a finite set of radio identities are used for differentiating individual radio connections with respective wireless nodes. The example method is implemented by a network node associated with a first service area in the network and includes borrowing a first radio identity that is associated with a neighboring service area in the network, assigning the first radio identity to a first wireless node for operation in the first service are. The method further includes performing at least one of the following: subsequently assigning a second radio identity to the first wireless node, for continued operation of the first wireless node in the first service area, wherein the second radio identity is associated with the first service area; sending an indication to a network node in the neighboring service area, indicating that the borrowing of the first radio identity for the first wireless node has ended; and lending, subject to any lending restrictions imposed on the first radio identity, the first radio identity to a further service area, for movement of the first wireless node from the first service area to the further service area.

A related example embodiment involves a network node that is configured to operate in a wireless communication network, in which radio identities allocable by the network from a finite set of radio identities are used for differentiating individual radio connections with respective wireless nodes. The network node in an example implementation includes a communication interface that is configured for exchanging signaling with one or more radio network node in the network for transferring radio identities between respective service areas of the network. Further, the network node includes a processing circuit that is operatively associated with the communication interface and configured to borrow a first radio identity that is associated with a neighboring service area in the network. The processing circuit is further configured to assign the first radio identity to a first wireless node for operation in the first service area, and to perform at least one of the following operations: subsequently assign a second radio identity to the first wireless node, for continued operation of the first wireless node in the first service area, wherein the second radio identity is associated with the first service area; send an indication to a network node in the neighboring service area, indicating that the borrowing of the first radio identity for the first wireless node has ended; and lend, subject to any lending restrictions imposed on the first radio identity, the first radio identity to a further service area, for movement of the first wireless node from the first service area to the further service area.

A further related embodiment involves a method of managing radio identities in a wireless communication network, in which radio identities allocable by the network from a finite set of radio identities are used for differentiating individual radio connections with respective wireless nodes. The example method includes associating respective subsets of the radio identities with respective service areas among a plurality of service areas of the network. The method further includes, within any given first service area among the plurality of service areas, assigning radio identities, as needed, from the subset of radio identities associated with the first service area, for establishing radio connections with wireless nodes operating in the first service area. With respect to an incoming wireless node incoming to the first service area from a second service area and having a current radio identity assigned from the subset of radio identities associated with the second service area, the method further includes borrowing the current radio identity, as a borrowed radio identity, for use in supporting the incoming wireless node in the first service area, so as to provide continued use of the same radio identity as the incoming wireless node moves from the second service area to the first service area. The method also includes subsequently terminating use of the borrowed radio identity and assigning to the incoming wireless node a radio identity taken from the subset associated with first service area, so as to return the borrowed radio identity for use in the second service area.

Still further, with respect to an outgoing wireless node outgoing from the first service area to a third service area and having a current radio identity assigned from the subset of radio identities associated with the first service area, the method includes lending the current radio identity, as a lent radio identity, for use in supporting the incoming wireless node in the third service area. The lending operation provides continued use of the same radio identity as the outgoing wireless node moves from the first service area to the third service area. Correspondingly, the method includes deferring new assignments of the lent radio identity within the first service area during a lending period associated with the lent radio identity.

Yet another embodiment involves a method of operation at a wireless node configured for operation in a wireless communication network. The example method includes determining a first radio identity assigned by network to the wireless node, and using the first radio identity for differentiating a radio connection between the wireless node and the network. Here, the radio connection in question is being supported by a first service area of the network, and the method further includes receiving signaling from the network indicating that the radio connection is being moved to a second service area of the network, and continuing to use the first radio identity with respect to the radio connection, for continuing the radio connection with the second service area.

A related embodiment involves a wireless node configured for operation in a wireless communication network. The example wireless node includes a communication interface configured for radio communications with the network, and a processing circuit that is operatively associated with the communication interface. The processing circuit is configured to determine a first radio identity assigned by network to the wireless node, and to use the first radio identity for differentiating a radio connection between the wireless node and the network. Here, the radio connection in question is being supported by a first service area of the network, and the processing circuit is further configured to receive signaling from the network indicating that the radio connection is being moved to a second service area of the network, and continue to use the first radio identity with respect to the radio connection, for continuing the radio connection with the second service area.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
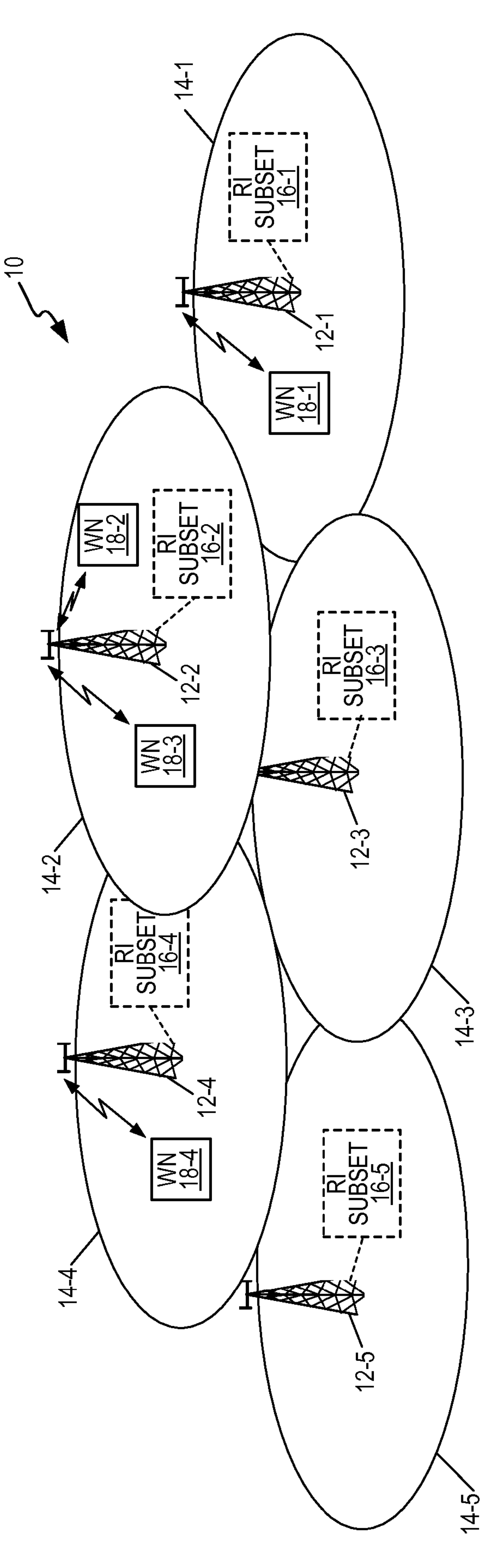
FIG. 1 is a block diagram of an example wireless communication network including one embodiment of a network node configured for radio resource management.

FIG. 1 illustrates an example embodiment of a wireless communication network 10 that includes a Radio Access Network, RAN, portion comprising a number of radio network nodes 12, e.g., 12-1, 12-2, and so on. Each radio network node 12 provides communication services in one or more service areas 14, e.g., a first radio network node 12-1 provides communication services within a first service area 14-1, a second radio network node 12-2 provides communication services within a second service area 14-2, and so on.

The radio network nodes 12 are, for example, base stations, access points or other radio transceiver nodes that provide radio connectivity in which user-specific radio connections or links are differentiated using radio identifiers, subsets 16 of which are associated with the respective service areas 14, for allocation to given wireless nodes 18 operating in the respective service areas 14. The radio network nodes 12 shall be understood as having wireless interfaces—e.g., cellular radio transceivers circuitry—for communicating with wireless nodes 18, and the wireless nodes 18 shall be understood as representing essentially any type of wireless device or apparatus that is configured to operate within the network 10. Non-limiting examples include smartphones, feature phones, modems, wireless adaptors, Machine Type Communication or MTC devices, laptops, tablets, or other type of "user equipment" or UE, or subscriber device.

For at least some types of communications, e.g., at least for certain data transmissions or data channels, the network 10 uses allocable radio identities to differentiate the transmissions to or from a given one of the wireless nodes 18 with respect to the transmissions to or from another one or ones of the wireless nodes 18. In this context, a finite pool of radio identities may be subdivided into a first subset 16-1 that is associated with the first service area 14-1, a second subset 16-2 associated with the second service area 14-2, and so on. These associations may have a geographic sense. For example, there may be a desire to limit the possibility or frequency of the same radio identity being allocated to different wireless nodes 18 in close proximity to one another.

For example, DeModulation Reference Signals or DMRSs are a type of radio identity used in communication networks based on Long Term Evolution, LTE, and LTE-Advanced networks. In this context and with respect to uplink transmissions, DMRSs are Zadoff-Chu sequences or other sequences that are assigned to individual users. In turn, each user applies the assigned DMRS to its uplink data transmissions. The receiving radio network node(s) use the DMRS assigned to each user to recover the transmissions originating from that user, and the network as a general proposition avoids simultaneous use of the same DMRS by different users operating in the same geographic location, to avoid interference.

Figure 2:
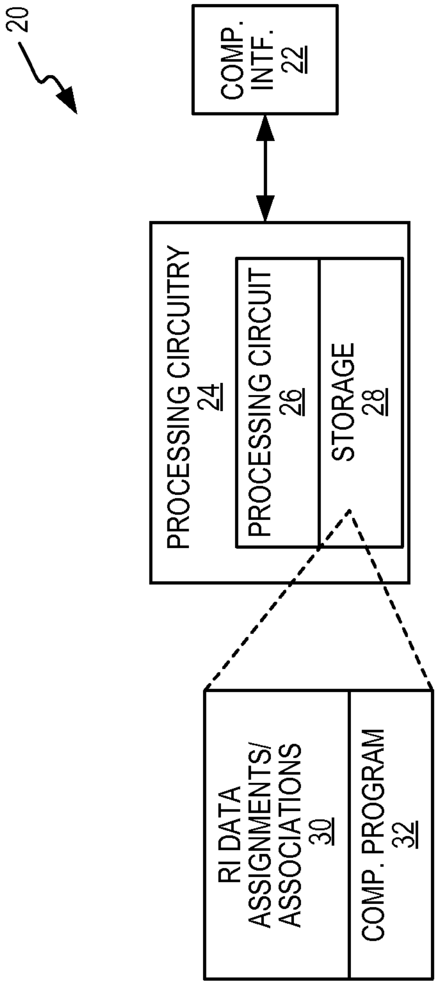
FIG. 2 is a block diagram of example implementation details for the network node introduced in FIG. 1.

As will be appreciated, each radio network node 12 comprises a potentially complicated mix of control and communication circuitry for carrying out the network-side aspects of the radio resource management taught herein. FIG. 2 provides a non-limiting example embodiment of the communications and control circuitry 20 that may be implemented in any or all of the radio network nodes 12.

The communications and control circuitry 20 includes a communication interface 22 and processing circuitry 24. The processing circuitry 24 comprises or includes a processing circuit 26 and storage 28. In a non-limiting example, the processing circuit 26 comprises computer circuitry, such as one or more microprocessors, Digital Signal Processors or DSPs, Application Specific Integrated Circuits or ASICs, Field Programmable Gate Arrays or FPGAs, or other digital processing circuitry. Correspondingly, the storage 28 comprises one or more types of non-transitory computer-readable media storing radio identity assignment and association information 30 and a computer program 32.

As a non-limiting example, the radio identity assignment and association information 30 comprises information indicating the currently assigned and/or currently unassigned radio identities for one or more service areas 14, and further comprises information indicating the default of initial associations of subsets 16 of radio identities with corresponding service areas 14. Still further, the radio identity assignment and association information 30 may include dynamically determined or instantiated information that indicates all radio identity "borrowing" and "lending", such as taught herein.

As a further non-limiting example, the computer program 32 comprises computer program instructions for execution by the processing circuitry 24. Here, the computer program 32 comprises computer program instructions, the execution of which by the processing circuitry 24 configures the processing circuit 26 according to the network-side radio identity management teachings described herein. Of course, the processing circuit 26 may also include or comprise fixed circuitry, or a mix of fixed and programmed circuitry.

Figure 3:
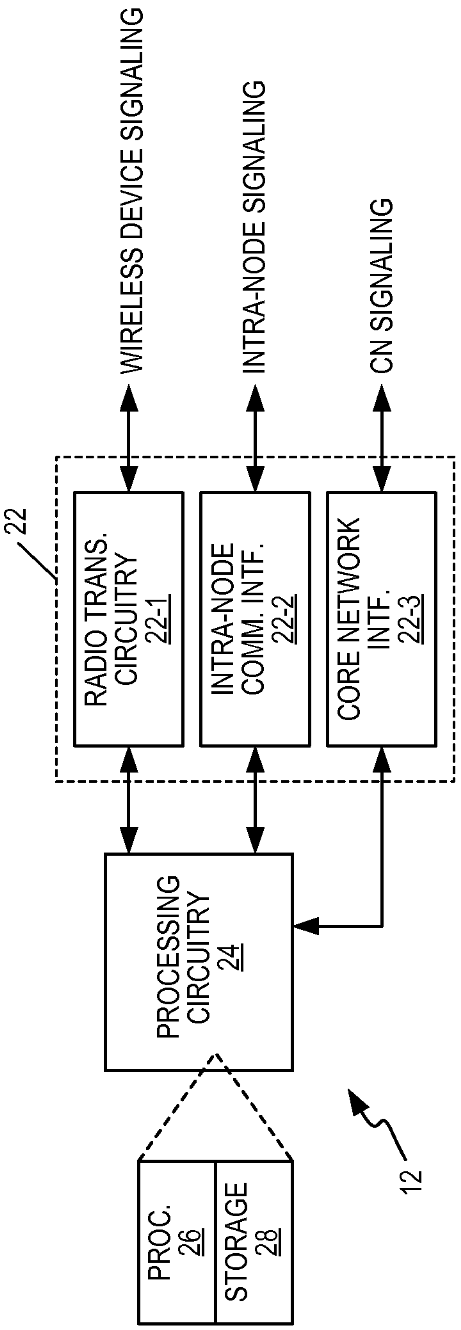
FIG. 3 is a block diagram of further example details for the network node introduced in FIG. 1.

FIG. 3 illustrates further example details for a radio network node 12. In particular, one sees that the communication interface 22 in this example includes radio transceiver circuitry 22-1, for transmitting to and receiving from wireless nodes 18, intra-node interface circuitry 22-2 for communicating with other radio network nodes 12, e.g., for radio resource management, and core network interface circuitry 22-3, for communicating with one or more core network nodes, such as mobility management entities, packet gateways, etc., which are not shown in the diagram.

Figure 4:
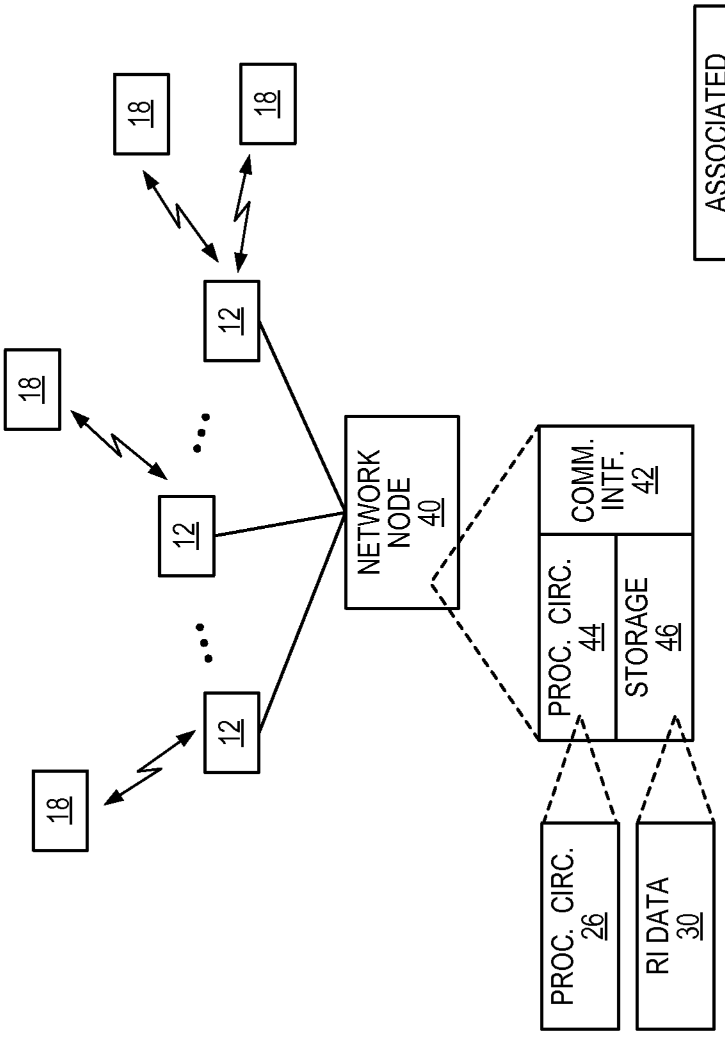
FIG. 4 is diagram illustrating an example division of a finite set of radio identities into respective subsets of identities, for association with corresponding service areas of a wireless communication network.

FIG. 4 introduces another network node 40, which is present in some embodiments contemplated herein. In particular, rather than implementing the network-side radio resource management functions contemplated herein in the respective radio network nodes 12, all or some of that functionality is implemented in the network node 40. Advantageously, the network node 40 may be centralized in some sense with respect to multiple radio network nodes 12. The network node 40 may or may not be a "radio" network node in that it may or may not have radio transceiver circuitry for communicating with wireless nodes 18 directly over the air interface.

Thus, when the term "network node" is used herein, the node may or may not include radio transceiver circuitry and, when helpful in context, network nodes that do include radio transceiver circuitry, e.g., for providing connectivity to wireless nodes 18, such nodes may be referred to particularly as "radio network nodes". Here, the network node 40 may be in the Radio Access Network or RAN part of the network 10, or may be in the Core Network or CN part of the network 10.

In one example, the network node 40 is a radio network controller that is centralized in some sense with respect to two or more radio network nodes 12, and provides at least some of the radio resource management contemplated herein on the network side. As another example, the network nodes 12 are radio heads or transmission points in a distributed antenna system or DAS, and the network node 40 controls the operations of the DAS, including controlling the use and distribution of allocable radio identities across and among the service areas 14.

FIG. 4 indicates that the network node 40 in the example illustration has communication links to the respective radio network nodes 12 and includes a communication interface 42 that is configured to communicate with the radio network nodes 12. The communication interface 42 is, for example, a backhaul communication interface configured for exchanging data and control signaling with the radio network nodes 12.

The network node 40 includes processing circuitry 44 and associated storage 46. The processing circuitry 44 and storage 46 of the network node 40 may differ in specific ways from the previously described processing circuitry 24 and storage 28 of the radio network nodes 12. However, for purposes of this discussion, it shall be understood that processing circuitry 44 may be configured to implement a version of the aforementioned processing circuit 26, as configured for network-side radio resource management. Complementing that arrangement, the aforementioned radio identity allocation and assignment information 30 may be stored and maintained in the storage 46. Further, in some embodiments, the overall functionality contemplated herein on the network side for radio resource management may be cooperatively implemented in respective ones of the radio network nodes 12, along with one or more centralized or quasi-centralized network nodes 40.

Figure 5:
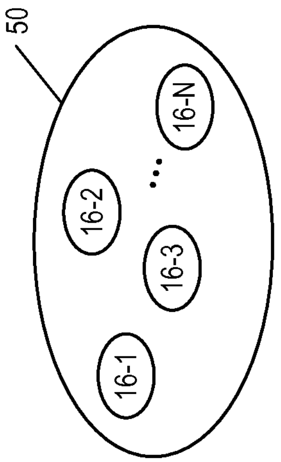
FIG. 5 is a diagram of a set of radio identities, which are individually allocable for differentiating radio connections between a wireless communication network and individual wireless nodes being served by the network, and which are divided into subsets of radio identities associated with different service areas of the network.

Now consider the set 50 of radio identities illustrated in FIG. 5. The set 50 comprises, for example, a set of DMRS sequences, e.g., derived from a base sequence using a plurality of defined offsets, or comprises one or more other types of radio identities. The set 50 is divided into the aforementioned subsets 16, e.g., a subset 16-1 that is associated with a first service area 14-1 of the network 10, a subset 16-2 that is associated with a second service area 14-2 of the network 10, and so on. The subsets 16 may be mutually exclusive or one or more of the subsets 16 may overlap. The subsets 16 in some embodiments are the same size, and in other embodiments two or more of the subsets 16 are of different sizes. For example, the number of members in each subset 16 may be set according to the relative sizes of the service areas 14, the nature of the server areas, e.g., urban, rural, etc.

With the above in mind, a network node 12 or 40 is configured to operate in the network 10, in which radio identities allocable by the network 10 from a finite set 50 of radio identities are used for differentiating individual radio connections with respective wireless nodes 18. The network node 12 or 40 includes a communication interface 22 or 42 that is configured for exchanging signaling with one or more network nodes 12 in the network 10, for transferring radio identities between respective service areas 14 of the network 10.

Such transfer signaling may include, for example any one or more of "borrowing" signaling, "lending" signaling. As will be detailed herein, the transfer signaling between network nodes 12 and/or 40 used for the temporary transfer of a radio identity from its "default service area" to another service area, e.g., may include an indication of temporal and/or geographic restrictions on the transfer, so as to limit the migration, spread or propagation of the transferred identity within the network 10. Further, in some embodiments, the lending and borrowing "protocol" defines a "reject message" or equivalent signaling. In one example, consider a case where a first network node 12 determines that it should lend a radio identity to a second network node 12. However, the second network node 12 determines that it cannot receive that radio identity without causing an identity conflict with an already utilized radio identity in a third network node 12 that is a neighbor to the second network node 12 but is not a neighbor to the first node network node 12. Based on this determination of conflict, the second network node "rejects" the lending and sends an indication of that rejection—e.g., a reject message—to the first network node 12, which can then carry out one or more operations that are an alternative to the attempted lending.

For this example processing and/or for other processing disclosed herein, a network node 12 or 40 further includes a processing circuit 26 that is operatively associated with the communication interface 22 or 42. The processing circuit 26 is configured to assign a first radio identity that is associated with a first service area 14-1 in the network 10 to a first wireless node 18-1 for operation in the first service area 14-1, and to transfer use of the first radio identity from the first service area 14-1 to a second service area 14-2, so as to continue the radio connection with the first wireless node 18-1 in conjunction with the first wireless node 18-1 moving from the first service area 14-1 to the second service area 14-2. Further, the processing circuit 26 is configured to defer any new use of the first radio identity within the first service area 14-1 until termination of a lending period governing the transfer of the first radio identity.

Here "new use" of the first radio identity refers to any usage of the first radio identity that would conflict with or be in tension with respect to usage of the first radio identity by the first wireless node 18. Also, the word "moving" or "move" connotes at least the "logical" movement of the first wireless node 18-1, wherein the responsibility for serving the first wireless node 18-1 moves or shifts from the first service area 14-1 to the second service area 14-2. Of course, a physical movement of the first wireless node 18-1 may also be involved and may be the thing that precipitated the change in service areas 14. However, the network 10 may "move" wireless nodes 18 from one service area 14 to another, e.g., for load balancing, interference management, etc. For example, the geographic location of a wireless node 18 may be such that it enjoys sufficiently good signal quality with respect to two or more service areas 14, which allows the network 10 to exercise considerable discretion in selecting which service area 14 shall allocate resources for serving the wireless node 18.

Figure 6:
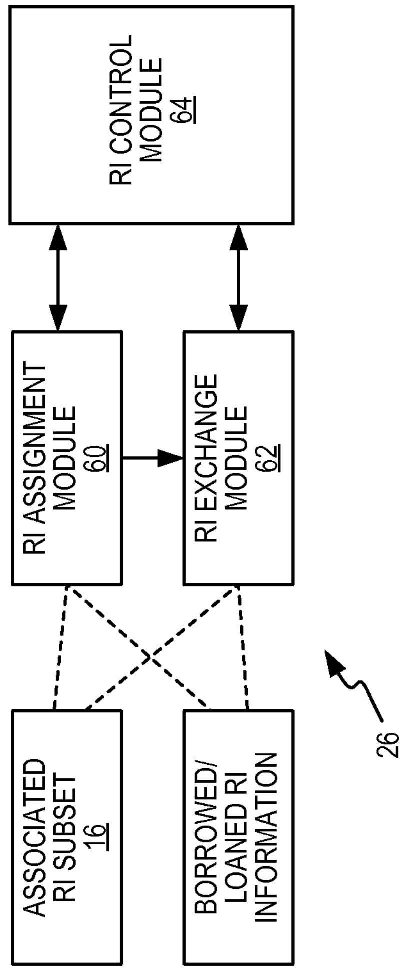
FIG. 6 is a block diagram of example processing modules that are configured to carry out the teachings presented herein for managing radio resources as taught herein.

FIG. 6 illustrates a computer implementation of the processing circuit 26, which includes an arrangement of functional or processing modules, such as may be realized within computer processing circuitry according to the execution of stored computer program instructions. Among the modules, one sees a radio identity or "RI" assignment module 60 that is configured to assign radio identities to respective wireless nodes 18 or corresponding radio connections. These assignments may be made with respect to one or of the service areas 14, and may include initial and subsequent assignments, along with assignments associated with borrowed or lent radio identities.

One further sees a RI exchange module 62 that is configured to exchange radio identity assignment and/or allocation information with other network nodes 12 or 40 involved in managing the radio identities as a resource within the network 10. The exchange module 62 may send information indicating the default assignments associated with each of one or more service areas 14 and may, e.g., under the RI control module 64, send and receive signaling to conduct radio identity borrowing and lending operations.

Still further, one sees the aforementioned RI control module 64. The RI control module 64 is configured to control the allocation of radio identities and to support any one or more of the radio identity transfer functions contemplated herein, which may be regarded as borrowing and/or lending functions.

Consider the example case where a first radio identity that is associated with a first service area 14-1 in the network 10 is assigned to a first wireless node 18-1 for operation in the first service area 14-1. The processing circuit 26, as implemented in a radio network node 12 and/or in a network node 40, is configured to assign the first radio identity from a subset 16-1 of the finite set 50 of radio identities that is associated with the first service area 14-1. As explained, the associated subset 16-1 of radio identities may be one among a number of respective subsets 16, each such subset 16 being associated with a different service area 14 within the network 10.

Where the processing circuit 26 at issue is implemented within a first radio network node 12-1 associated with the first service area 14-1, the processing circuit 26 may be configured to transfer the first radio identity by sending lending signaling to a second radio network node 12-2 associated with the second service area 14-2. The lending signaling includes an indication of the first radio identity. In some embodiments, the processing circuit 26 is configured to indicate in the lending signaling one or more limitations restricting at least one of: how long the first radio identity may be used in the second service area 14-2 for the first wireless node 18-1; and whether or to what extent the first radio identity can be transferred from the second service area 14-2 for continued use of the first radio identity for the first wireless node 18-1 in a further service area 14.

Thus, in an example case, a radio identity that is associated with a first service area 14-1 is initially allocated for use in differentiating a radio connection to a first wireless node 18-1 operating in the first service area 14-1. Then, for seamless transfer or movement of the wireless node 18-1 and its radio connection to a second service area 14-2, the radio identity is temporarily transferred, lent, to the second service 14-2, for supporting the radio connection in the second service area 14-2. Any temporal or geographic limitations on use of the transferred radio identity may be indicated, so as to constrain use of the transferred identity in the second service area 14-2.

These operations allow, for example, the serving connection of a wireless node 18 to be moved from one service area 14 to a new service area 14, without having to reconfigure the connection according to a radio identity newly assigned for the new service area 14. As a non-limiting example, the temporary transfer persists while the involved wireless node 18 is in a geographic area associated with cell boundaries or other known lower-quality signal regions, and a new radio identity that is "native" to the new service area 14 is assigned once the wireless node 18 moves into better signal conditions with respect to the new service area 14.

Broadly, however, the temporary transfer of a given radio identity from its default service area 14 for use in another service are 14 is limited temporally and/or geographically. Limiting the temporal and/or geographic scope of the radio identity transfer allows the network 10 to substantially maintain the nominal or default associations of the subsets 16 of radio identities with their respective service areas 14, which allows the network 10 to prevent or at least reduce the likelihood of conflicting uses of radio identities in the same service area 14.

In another example involving a first service area 14-1, the processing circuit 26 is configured to borrow a second radio identity that is associated with a neighboring service area 14 in the network 10 and assign the second radio identity to a second wireless node 18-2 for operation in the first service area 14-1. The borrowing may be as a consequence of the second wireless node 18-2 incoming to the first service area 14-1, or may be initiated responsive to the second wireless node 18-2 initially connecting to the network 10 in the first service area 14-1 at a time when there are no remaining radio identities available for allocation from the default associated subset of radio identities 16-1.

That is, the processing circuit 26 in one or more embodiments is configured to borrow the second radio identity responsive to determining that no radio identities are currently available in the first service area 14-1 for assignment to the second wireless node 18-2. Where the processing circuit 26 is implemented in a first radio network node 12-1 associated with the first service area 14-1, the processing circuit 26 is configured to "borrow" the second radio identity by sending a borrowing request to a second radio network node 12-2 associated with the neighboring service area 14, and receiving return signaling indicating the second radio identity.

In at least one such embodiment, the processing circuit 26 at the first radio network node 12-1 receives return signaling in response to its borrowing request. Here, the processing circuit 26 is configured to determine from information included in the return signaling at least one of: how long the second radio identity may be used in the first service area 14-1 for the second wireless node 18-2, and whether or to what extent the second radio identity can be transferred from the first service area 14-1 for continued use of the second radio identity for the second wireless node 18-2 in a further service area 14. The processing circuit 26 limits use of the second radio identity for the radio connection with the second wireless node 18-2, in accordance with the information included in the return signaling.

The radio identity at issue may comprise a specific DMRS, as previously noted. More broadly, the radio identity comprises one or more parameters, sequences, values, or the like, which are at least temporarily used by the network 10 to differentiate the radio connection of a given wireless node 18 for service a given service area 14. In at least one embodiment, the radio identity comprises or maps to any one or more of the following: a DMRS; a physical layer scrambling sequence; a scrambling sequence used for randomization of data packets; a radio-connection specific synchronization signal; and a radio network temporary identifier, RNTI.

In another example configuration of the processing circuit 26, and assuming that the processing circuit 26 in question here resides in a first radio network node 12-1 that is associated with a first service area 14-1, the processing circuit 26 is configured to send signaling to a first wireless node 18-1, wherein the signaling is sent from the first radio network node 12-1 and includes at least one of: an indication that the radio connection with the first wireless node 18-1 is being transferred from the first service area 14-1 to a second service area 14-2, and an indication to reset radio channel filtering in use at the first wireless node 18-1, for receiving on the radio connection.

In more detail, the first radio network node 12-1 may send signaling to the first wireless node 18-1 and/or to the second radio network node 12-2 associated with the second service area 14-2, to initiate the transfer of the radio identity of the first wireless node 18-1 from the first service area 14-1 to the second service area 14-2. At the same time, or subsequent to such signaling, the first radio network node 12-1 indicates to the first wireless node 18-1 that a filter reset is needed at the first wireless node 18-1. The reset signaling may be sent when the reset should happen, or may be sent in advance with an indication of the time at which it should be applied, or the wireless node 18-1 may be intelligent enough to determine when to initiate the reset. In any case, the reset reflects the fact that the propagation channel to the second radio network node 12-2 may be substantially different than the propagation channel to the first radio network node 12-1. Thus, even though the radio connection is not reconfigured in terms of radio identities, the wireless node 18-1 may reset or initialize its receiver processing to reflect the changed transmission point involved in a transfer of its radio identity from one service area 14 to another.

Of course, in addition to a first service area 14-1 transferring a radio identity for use in a second service area 14-2, which is a form of "lending", the processing circuit 26 as implemented in a first radio network node 12-1 associated with a first service area 14-1 may also be configured to "borrow" a radio identity that is normally associated with another one of the service areas 14. In at least one such embodiment, the processing circuit 26 is configured to receive an indication at the first radio network node 12-1 that another radio identity, referred to as a transferred radio identity, is being transferred for continuing the radio connection of a wireless node 18 that is incoming to the first service area 14-1 from a neighboring service area 14, and use the transferred radio identity for continuing the radio connection with the incoming wireless node 18 in the first service area 14-1.

Figure 7:
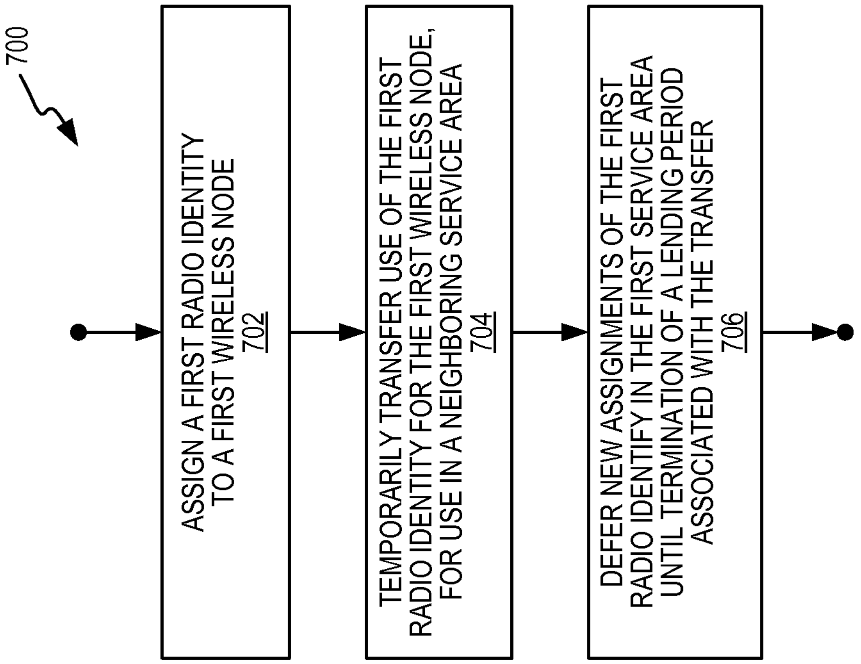
FIG. 7 is a logic flow diagram of a method of managing radio resources according to one embodiment taught herein.

FIG. 7 illustrates a method 700 of radio resource management in a wireless communication network 10 along the lines of the above-described processing configurations. In the context of the method 700, the radio identities are allocable by the network 10 from a finite set 50 of radio identities, and the individual radio identities are used for differentiating individual radio connections with respective wireless nodes 18. The method 700 may be implemented individually or cooperatively in any one or more of the radio network nodes 12, or individually or cooperatively in any one or more centralized or quasi-centralized network nodes 40.

The method 700 includes assigning (Block 702) a first radio identity that is associated with a first service area 14-1 in the network 10 to a first wireless node 18-1, for operation in the first service area 14-1, and transferring (Block 704) use of the first radio identity from the first service area 14-1 to a second service area 14-2, so as to continue the radio connection with the first wireless node 18-1 in conjunction with the first wireless node 18-1 moving from the first service area 14-1 to the second service area 14-2. The method 700 further includes deferring (Block 706) any new assignment of the first radio identity within the first service area 14-1 until termination of a lending period governing the transfer of the first radio identity.

Figure 8A:
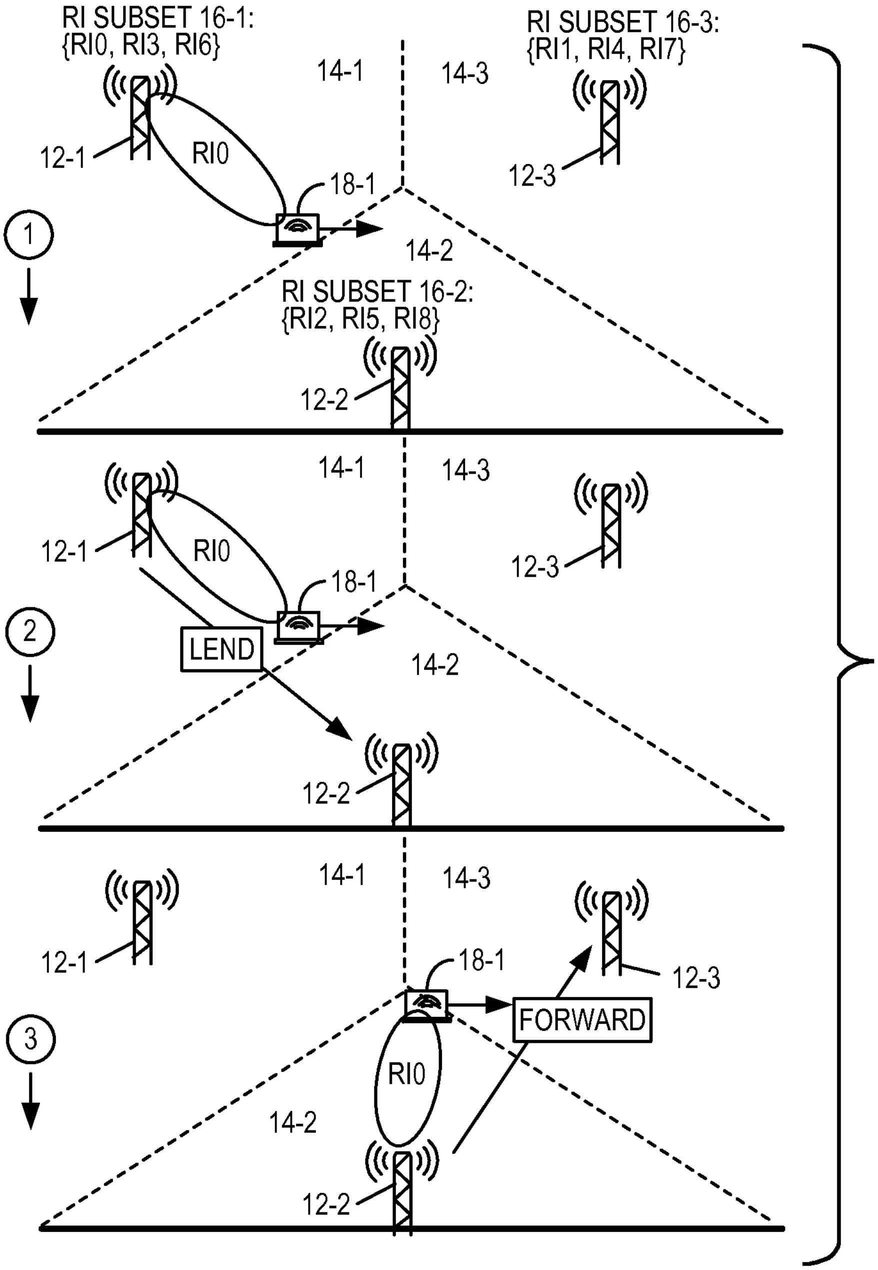
FIGS. 8A and 8B comprise sequences of block diagrams according to one example of transferring a radio identity from one service area of a wireless communication network for temporary use in another area of the network.

FIG. 8A illustrates a sequence of related illustrations 1, 2, and 3. The topmost illustration, image 1, illustrates three service areas 14-1, 14-2 and 14-3. A subset of radio identities 16-1 is associated with the service area 14-1 and includes radio identities RI0, RI3 and RI6. Similarly, a subset of radio identities 16-2 is associated with the service area 14-2 and includes radio identities RI2, RI5 and RI8, while the radio identities RI1, RI4 and RI7 in a subset 16-3 are associated with the service area 14-3.

A connection is established for a wireless node 18-1 in the service area 14-1 and uses the radio identity RI0. In the middle image, image 2, one sees that the radio identity RI0 is lent to the second service area 14-2, to move the wireless node 18-1 and its radio connection to the second service area 14-2. Finally, in the bottom image, image 3, one sees that the same radio identity is forwarded from the service area 14-2 to the third service area 14-3, to continue the radio connection of the first wireless node 18-1 as it moves from the second service area 14-2 into the third service area 14-3.

Figure 8B:
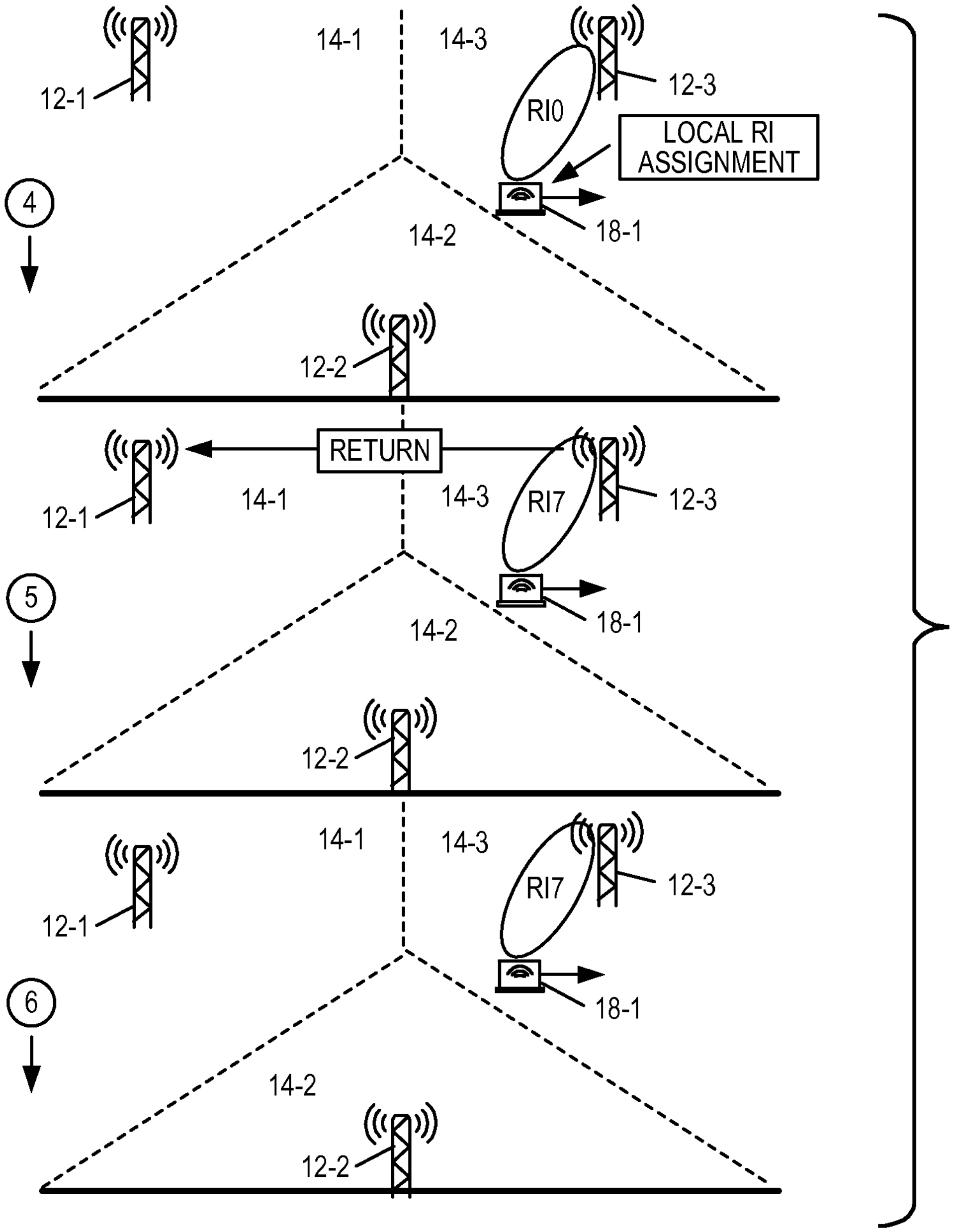

FIG. 8B continues the sequence of images, wherein in the top-most image, image 4, one sees that the radio connection for the first wireless node 18-1 in the third service area 14-3 is using the forwarded radio identity RI0. Referring back to FIG. 8A, that identity is normally associated with the first service area 14-1 and was initially allocated in the first service area 14-1. Subsequent to that allocation, the radio identity RI0 was lent for use in the second service area 14-2, in conjunction with the wireless node 18-1 moving from the first service area 14-1 to the second service area 14-2. Further, the radio identity RI0 was then forwarded for use in the third service area 14-3, in conjunction with the wireless node 18-1 moving from the second service area 14-2 to the third service area 14-3.

In image 5, the middle image, one sees that a radio identity—e.g., RI7—that is "native" to the third service area 14-3 is assigned to the wireless node 18-1, for continued operation of the wireless node 18-1 in the third service area 14-3. This new assignment allows the forwarded radio identity RI0 to be returned to the first service area 14-1, e.g., by signaling a return indicator to the radio network node 12-1 associated with the first service area 14-1. In image 6, the bottom-most image, one sees that operation in the third service area 14-3 continues based on use of the newly assigned native or local radio identity.

Figure 9:
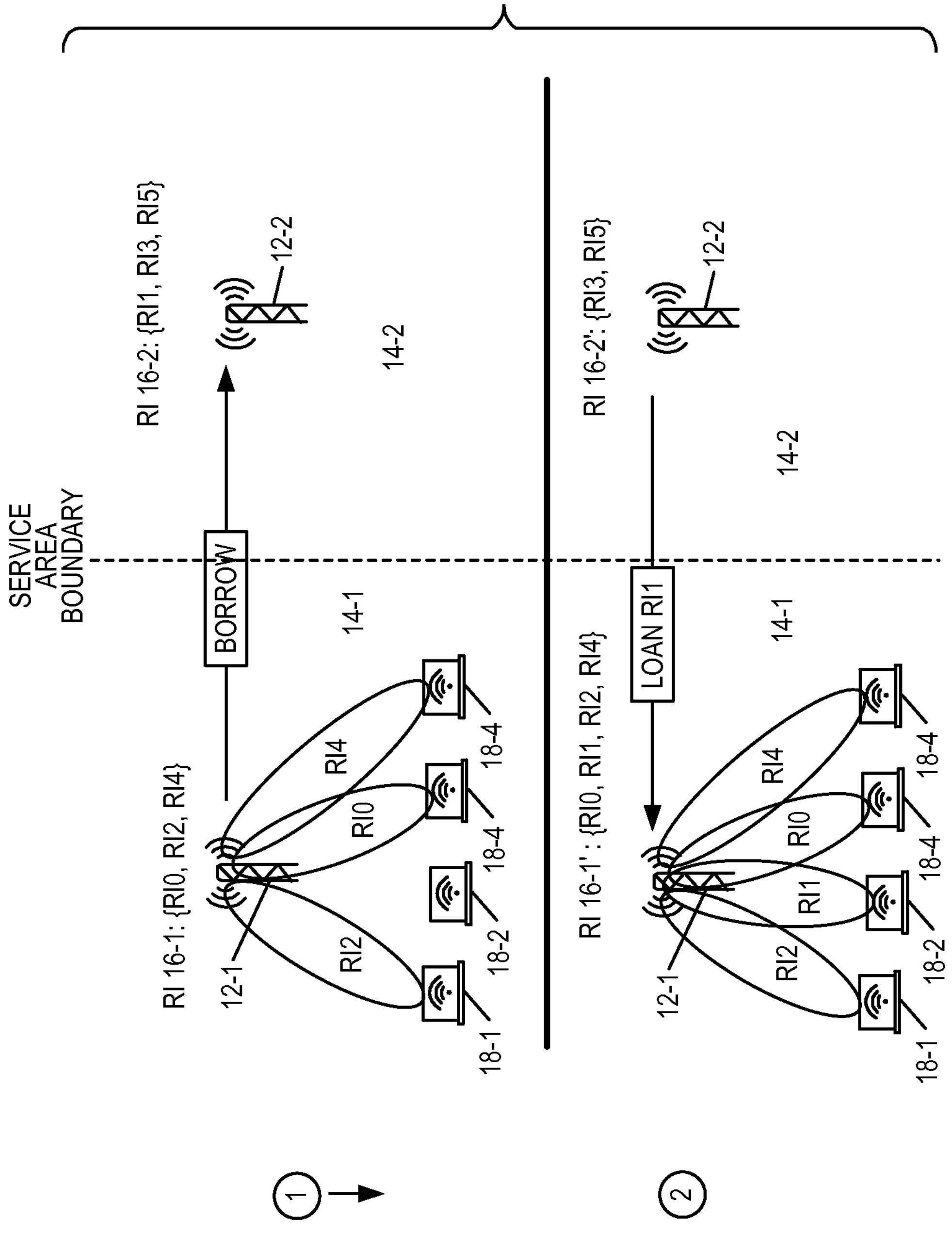
FIG. 9 comprises a sequence of block diagrams according to one example of borrowing a radio identity from one service area in a wireless communication network, for temporary use in another area of the network.

FIG. 9 illustrates another scenario involving radio identity borrowing as contemplated herein in one or more embodiments. In the topmost image, image 1, one sees that a number of wireless nodes 18-1, 18-3 and 18-4 have been allocated radio identities RI0, RI2 and RI4, from the subset 16-1 of radio identities associated with the first service area 14-1. These allocations exhaust the subset 16-1, leaving no allocable radio identity for the wireless node 18-2.

The radio network node 12-1 therefore sends signaling to the radio network node 12-2 of the service area 14-2, indicating that it wishes to borrow a radio identity. The radio network node 12-2 lends one of its radio identities—e.g., RI1—to the radio network node 12-1, shown here as RI1 by way of example. The loaned radio identity is taken from the subset 16-2 of radio identities that is associated with the second service area 14-2. This lending effectively removes the loaned radio identity from the subset 16-2, at least temporarily until it is returned or until any defined lending period expires. Correspondingly, in the bottom image, image 2, one sees that the first radio network node 12-1 uses the loaned radio identity RI1 for allocation to the second wireless node 18-2.

Figure 10:
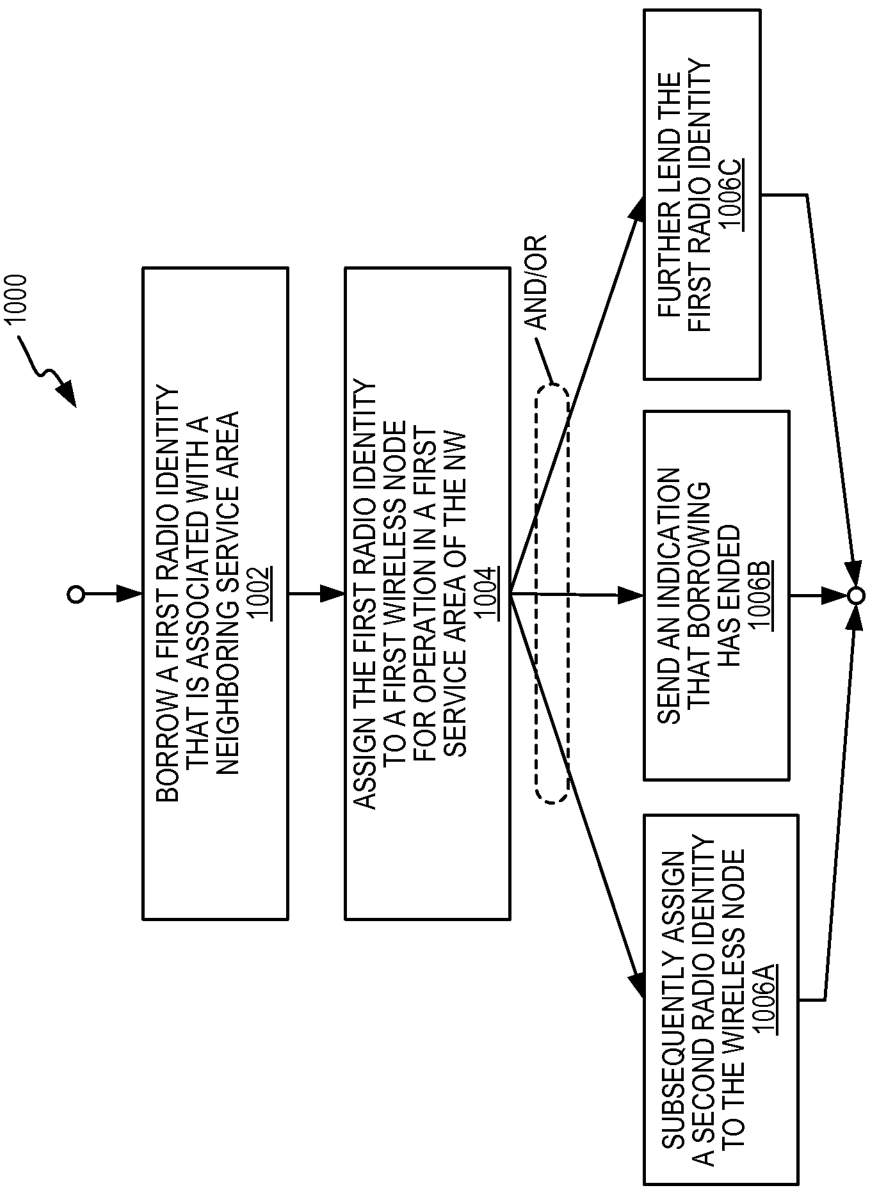
FIG. 10 is a logic flow diagram of a method of managing radio resources according to another embodiment taught herein.

FIG. 10 illustrates another embodiment of a method 1000 of radio resource management in a wireless communication network 10, in which radio identities allocable by the network 10 from a finite set 50 of radio identities are used for differentiating individual radio connections with respective wireless nodes 18. The method 1000 is implemented in at least one radio network node 12, e.g., in one or more radio base stations, or is implemented in another network node 40 that is centralized with respect to one or more service areas 14.

With respect to a given first service area 14-1 in the network 10, the method 1000 includes borrowing (Block 1002) a first radio identity that is associated with a neighboring service area 14 in the network 10. The method 1000 further includes assigning (Block 1004) the first radio identity to a first wireless node 18-1 for operation in the first service area 14-1, and performing at least one of the following: subsequently assigning (Block 1006A) a second radio identity to the first wireless node 18-1, for continued operation of the first wireless node 18-1 in the first service area 14-1, wherein the second radio identity is associated with the first service area 14-1; sending (Block 1006B) an indication to a network node 12 in the neighboring service area 14, indicating that the borrowing of the first radio identity for the first wireless node 18-1 has ended; and lending (Block 1006C), subject to any lending restrictions imposed on the first radio identity, the first radio identity to a further service area 14, for movement of the first wireless node 18-1 from the first service area 14-1 to the further service area 14.

In at least one embodiment, subsequently assigning (Block 1006A) the second radio identity to the first wireless node 18-1 comprises changing the first wireless node 18-1 from the first radio identity to the second radio identity within a time limit specified for borrowed usage of the first radio identity. Further, in at least one embodiment lending (Block 1006C) the first radio identity to the further service area 14 comprises at least one of: indicating to the network node 12 of the further service area 14 at least one of a geographic restriction and a temporal restriction limiting use of the first radio identity in the further service area 14. Finally, in at least one embodiment in which a borrowed radio identity can be further lent, the method 1000 includes indicating to the network node 12 in the neighboring service area 14 that the first radio identity is being lent for use in the further service area 14.

Thus, a radio network node 12 or other network node 40 includes a communication interface 22 or 42 that is configured for exchanging signaling with one or more radio network nodes 12 in the network 10, for transferring radio identities between respective service areas 14 of the network 10. In such embodiments, the processing circuit 26 is operatively associated with the communication interface 22 or 42 and is configured to borrow a first radio identity that is associated with a neighboring service area 14 in the network 10 and to assign the first radio identity to a first wireless node 18-1 for operation in the first service area 14-1.

Further the processing circuit 26 is configured to perform at least one of the following operations: subsequently assign a second radio identity to the first wireless node 18-1, for continued operation of the first wireless node 18-1 in the first service area 14-1, wherein the second radio identity is associated with the first service area 14-1; send an indication to a network node 12 in the neighboring service area 14, indicating that the borrowing of the first radio identity for the first wireless node 18-1 has ended; and lend, subject to any lending restrictions imposed on the first radio identity, the first radio identity to a further service area 14, for movement of the first wireless node 18-1 from the first service area 14-1 to the further service area 14.

Figure 11:
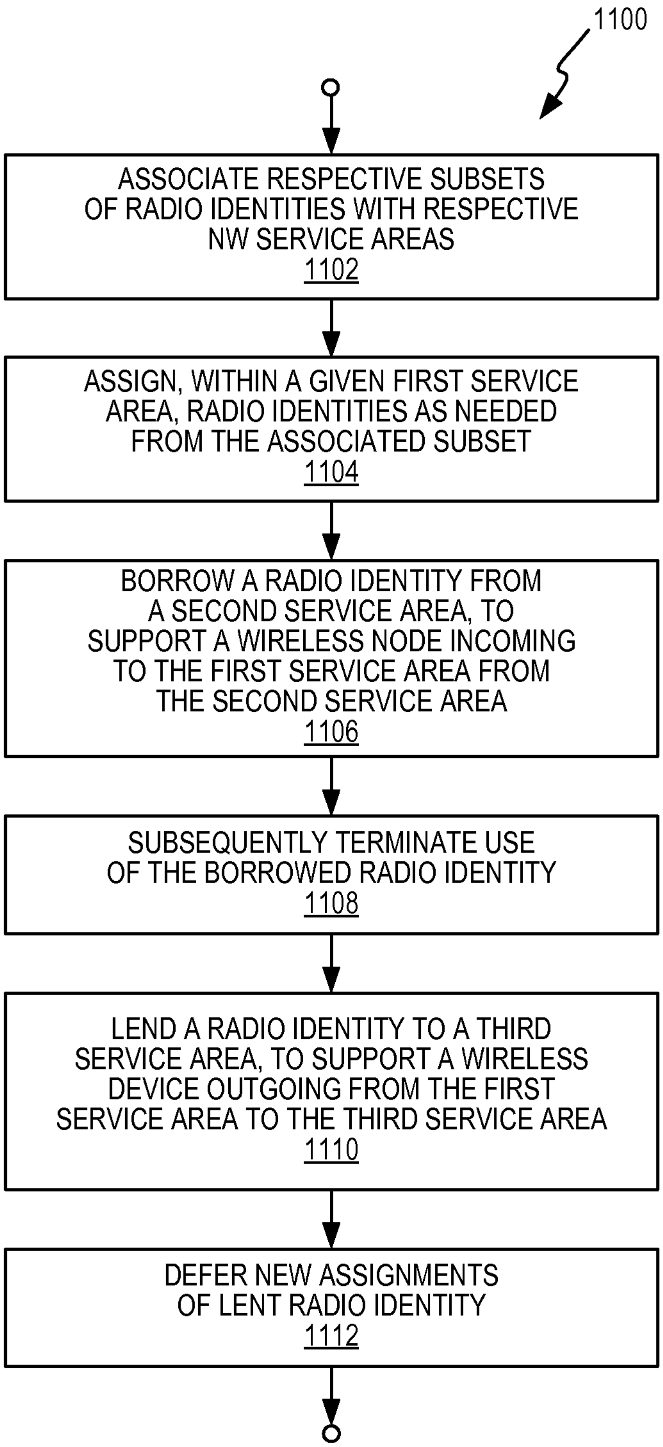
FIG. 11 is a logic flow diagram of a method of managing radio resources according to yet another embodiment taught herein.

FIG. 11 illustrates yet another embodiment of a method 1100 of managing radio identities in a wireless communication network 10, in which radio identities allocable by the network 10 from a finite set 50 of radio identities are used for differentiating individual radio connections with respective wireless nodes 18. The method 1100 may be implemented individually or cooperatively in each of the radio network nodes 12, or may be implemented in one or more network nodes 40, each of which is responsible for managing radio resources with respect to two or more of the radio network nodes 12 and their corresponding service areas 14.

The method 1100 includes associating (Block 1102) respective subsets 16 of the radio identities with respective service areas 14 among a plurality of service areas 14 of the network 10. Further, within any given first service area 14-1 among the plurality of service areas 14, the method 1100 includes assigning (Block 1104) radio identities, as needed, from the subset 16 of radio identities associated with the first service area 14-1, for establishing radio connections with wireless nodes 18-1 operating in the first service area 14-1. Still further, with respect to an incoming wireless node 18 incoming to the first service area 14-1 from a second service area 14-2 and having a current radio identity assigned from the subset 16 of radio identities associated with the second service area 14-2, the method 1100 includes: borrowing (Block 1106) the current radio identity, as a borrowed radio identity, for use in supporting the incoming wireless node 18 in the first service area 14-1, so as to provide continued use of the same radio identity as the incoming wireless node 18 moves from the second service area 14-2 to the first service area (14-1); and subsequently terminating (Block 1108) use of the borrowed radio identity and assigning to the incoming wireless node 18 a radio identity taken from the subset 16 associated with first service area 14-1, so as to return the borrowed radio identity for use in the second service area 14-2.

Further, with respect to an outgoing wireless node 18 outgoing from the first service area 14-1 to a third service area 14-3 and having a current radio identity assigned from the subset 16 of radio identities associated with the first service area 14-1, the method 1100 includes: lending (Block 1110) the current radio identity, as a lent radio identity, for use in supporting the incoming wireless node 18 in the third service area 14-3, so as to provide continued use of the same radio identity as the outgoing wireless node 18 moves from the first service area 14-1 to the third service area 14-3; and deferring (Block 1112) new assignments of the lent radio identity within the first service area 14-1 during a lending period associated with the lent radio identity.

Figure 12:
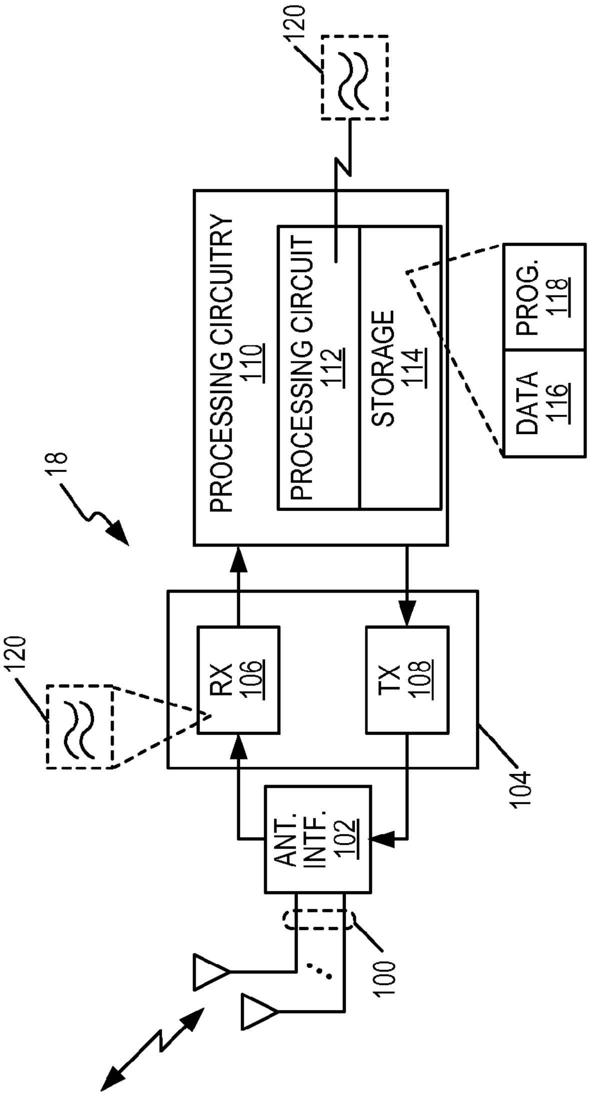
FIGS. 12 and 13 illustrate example embodiments of a wireless node, and an associated processing method, according to the teachings herein.

FIG. 12 illustrates an example embodiment of a wireless node 18, which may be essentially any type of wireless apparatus configured for operation in the network 10. Non-limiting examples includes user equipments or UEs, which also may be referred to as subscriber devices, user terminals, mobile terminals, etc. Smartphones, feature phones, pagers, modems, network adaptors, laptop computers and tables having wireless communication capabilities represent specific examples, but that listing is not exclusive. For example, the wireless nodes 18 may comprise Machine Type Communication, MTC, devices, such as are used in Machine-to-Machine, M2M, applications, or may comprise mobile relay nodes, etc.

The illustrated example wireless node 18 includes one or more antennas 100 that couples through an antenna interface circuit 102 to a radio transceiver 104, which includes a transmitter, TX, 108, and a receiver, RX, 106. The wireless node 18 further includes processing circuitry 110, e.g., one or more microprocessors, FPGAs, DSPs, ASICs, or other digital processing circuitry. The processing circuitry 110 includes or comprises a processing circuit 112 and is associated with storage 114, which may be one or more types of memory circuits or other storage devices. Such computer-readable medium or media provide non-transitory storage for various configuration data 116, and a computer program 118. In at least one example embodiment, the wireless node 18 is configured according to the teachings herein, based on its execution of the computer program instructions comprising the computer program 118. Those program instructions configure the processing circuit 112 to carry out certain algorithms, such as those described in the following further details.

The communication interface, e.g., the transceiver 104 with its TX 108 and RX 106, is configured for radio communications with the network 10, and the processing circuit 112 is configured to determine a first radio identity assigned by network 10 to the wireless node 18, and to use the first radio identity for differentiating a radio connection between the wireless node 18 and the network 10. Here, the radio connection being supported by a first service area 14-1 of the network 10, i.e., the radio connection consumes radio resources used for providing service in the first service area 14-1.

The processing circuit 112 is further configured to receive signaling from the network 10 indicating that the radio connection is being moved to a second service area 14-2 of the network 10, and continue to use the first radio identity with respect to the radio connection, for continuing the radio connection with the second service area 14-2. Further, in one or more embodiments, in response to receiving the aforementioned signaling from the network 10, the processing circuit 112 is configured to reset a radio channel filter 120 used by the wireless node 18 for receiving the radio connection. Resetting the radio channel filter 120 may comprise zeroing or reinitializing the filter coefficients used by the radio channel filter 120, which filter may be implemented in the RX 106, as a front-end circuit, or may be implemented in the processing circuit 112, as a baseband digital filter.

Figure 13:
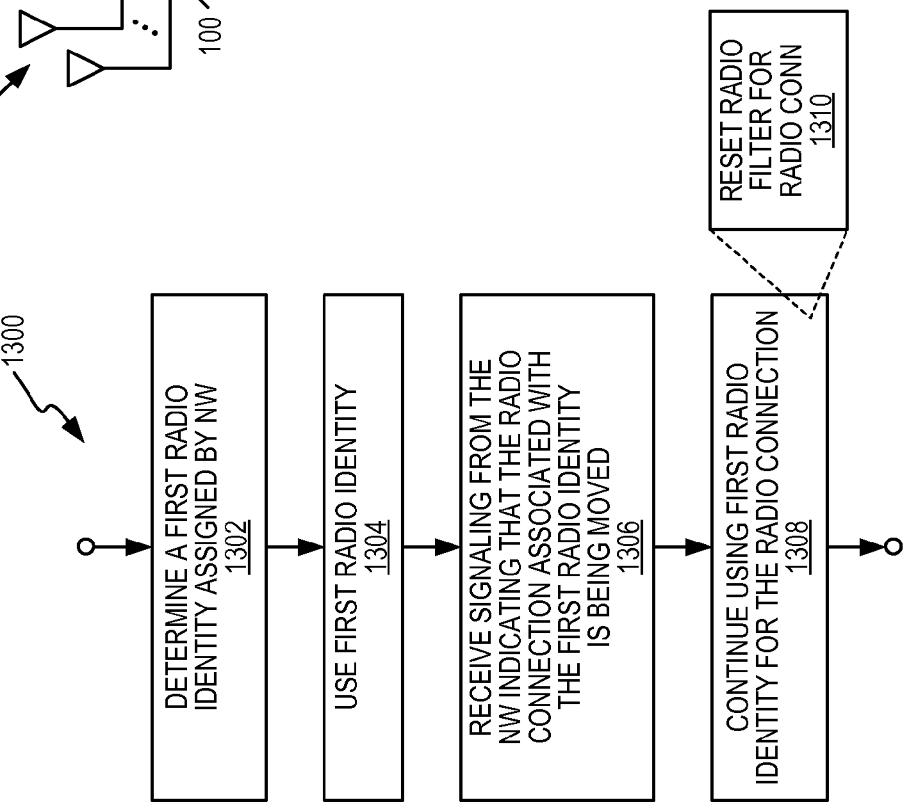

Correspondingly, FIG. 13 illustrates a method 1300 of operation implemented by the wireless node 18 of FIG. 12, or by essentially any implementation of a wireless node 18. The method 1300 includes determining (Block 1302) a first radio identity assigned by network 10 to the wireless node 18, and using (Block 1304) the first radio identity for differentiating a radio connection between the wireless node 18 and the network 10. The radio connection is supported by a first service area 14-1 of the network 10, and the method 1300 includes receiving (Block 1306) signaling from the network 10 indicating that the radio connection is being moved to a second service area 14-2 of the network 10, and continuing (Block 1308) to use the first radio identity with respect to the radio connection, for continuing the radio connection with the second service area 14-2. In some embodiments, the method 1300 further includes in response to the signaling from the network 10, resetting (Block 1310) a radio channel filter 120 used by the wireless node 18 for receiving on the radio connection.

In other example details, the radio identities at issue here may comprise or be understood as user-specific sequences, where "user" denotes a particular wireless node 18. Subsets 16 of these user-specific sequences may be associated in some default sense with respective service areas 14 of the network 10, but they can be view more generally as belonging at least temporarily to their respective users. The teachings herein provide a mechanism for borrowing, lending, forwarding, and otherwise transferring user-specific sequences between and among the various service areas 14, so that a user using a particular sequence in one service area 14 can continue using that sequence at least temporarily after it moves to a new service area 14. As an example from LTE, the user-specific sequences are uplink and/or downlink DMRS-sequence initializations and/or are C-RNTIs and downlink control channel configurations, Physical Cell IDs and/or signal sequences, which are used for channel and/or interference measurements.

The teachings herein can therefore be understood as providing flexibility in the assignment of radio identities, such that the good correlation properties of the sequences within a service area 14 as well as between neighboring service areas 14 is maintained, while still allowing for wireless nodes 18 to move between service areas without requiring a reconfiguration of the radio identities used for such nodes. These operations allow, for example, temporary "migration" of a given radio identity from one service area 14 to one or more other service areas 14, while also allowing the network 10 to maintain a basic radio identity planning or allocation scheme that limits conflicting use of the individual radio identities.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of radio resource management in a wireless communication network in which user-specific sequences allocable by the network from a finite set of user-specific sequences are used for physical-layer differentiation of individual radio connections with respective wireless nodes, said method implemented by a network node in the network and comprising:

assigning a user-specific sequence that is associated with a first service area in the network to a first wireless node for use in the first service area by the first wireless node in generating a user-specific uplink reference signal;

transferring, in conjunction with the first wireless node moving from the first service area to a second service area, use of the first user-specific sequence by the first wireless node, so as to enable the first wireless device to use the same user-specific uplink reference signal in the second service area; and deferring any new assignment of the first user-specific sequence within the first service area until termination of a lending period governing the transfer of the first user-specific sequence.

2. The method of claim 1, wherein assigning the first user-specific sequence comprises assigning the first user-specific sequence from a subset of the finite set of user-specific sequences that is associated with the first service area.

3. The method of claim 2, wherein the associated subset of user-specific sequences is one among a number of respective subsets, each such subset being associated with a different service area within the network.

4. The method of claim 1, wherein the network node comprises a first radio network node associated with the first service area, and wherein transferring the first user-specific sequence comprises the first radio network node sending lending signaling to a second radio network node associated with the second service area, said lending signaling including an indication of the first user-specific sequence.

5. The method of claim 4, further comprising indicating in said lending signaling one or more limitations restricting at least one of: how long the first user-specific sequence may be used in the second service area for the first wireless node; and whether or to what extent the first user-specific sequence can be transferred from the second service area for continued use of the first user-specific sequence for the first wireless node in a further service area.

6. The method of claim 1, further comprising, with respect to a second wireless node:

borrowing a second user-specific sequence that is associated with a neighboring service area in the network; and assigning the second user-specific sequence to a second wireless node for use by the second wireless node in the first service area.

7. The method of claim 6, wherein the network node comprises a first radio network node associated with the first service area, and the method further comprising borrowing the second user-specific sequence responsive to determining that no user-specific sequences are currently available in the first service area for assignment to the second wireless node; and wherein said borrowing comprises sending a borrowing request from the first radio network node to a second radio network node associated with the neighboring service area; and receiving return signaling at the first radio network node indicating the second user-specific sequence.

8. The method of claim 7, further comprising:

determining from information included in the return signaling at least one of: how long the second user-specific sequence may be used in the first service area for the second wireless node;

and whether or to what extent the second user-specific sequence can be transferred from the first service area for continued use of the second user-specific sequence by the second wireless node in a further service area; and limiting use of the second user-specific sequence by the radio connection with the second wireless node, in accordance with the information included in the return signaling.

9. The method of claim 1, wherein the first user-specific sequence comprises a demodulation modulation reference signal, DMRS.

10. The method of claim 1, wherein the network node comprises a first radio network node associated with the first service area and the method further comprises sending signaling to the first wireless node from the first radio network node, said signaling including at least one of: an indication that the radio connection with the first wireless node is being transferred from the first service area to the second service area, and an indication to reset radio channel filtering in use at the first wireless node, for receiving on the radio connection.

11. The method of claim 1, wherein the network node comprises a first radio network node associated with the first service area, and wherein the method further comprises:

receiving an indication at the first radio network node that a user-specific sequence, referred to as a transferred user-specific sequence, is being transferred for continued use by a wireless node that is incoming to the first service area from a neighboring service area; and differentiating the radio connection with the incoming wireless node in the first service area based on the transferred user-specific sequence.

12. A method of radio resource management in a wireless communication network in which user-specific sequences allocable by the network from a finite set of user-specific sequences are used for physical-layer differentiation of individual radio connections with respective wireless nodes, said method implemented by a network node associated with a first service area in the network and comprising:

borrowing a first user-specific sequence that is associated with a neighboring service area in the network;

assigning the first user-specific sequence to a first wireless node for use in the first service area by the first wireless node in generating a user-specific uplink reference signal; and performing at least one of the following:

subsequently assigning a second user-specific sequence to the first wireless node, for use by the first wireless node in the first service area instead of the first user-specific sequence, wherein the second user-specific sequence is associated with the first service area;

and lending, subject to any lending restrictions imposed on the first user-specific sequence and in response to movement of the first wireless node to a further service area, the first user-specific sequence to a further service area, for continued use by the first wireless node in the further service area.

13. The method of claim 12, wherein subsequently assigning the second user-specific sequence to the first wireless node comprises changing the first wireless node from the first user-specific sequence to the second user-specific sequence within a time limit specified for borrowed usage of the first user-specific sequence.

14. The method of claim 12, wherein lending the first user-specific sequence to the further service area comprises at least one of:

indicating to the network node of the further service area at least one of a geographic restriction and a temporal restriction limiting use of the first user-specific sequence in the further service area; and indicating to the network node in the neighboring service area that the first user-specific sequence is being lent for use in the further service area.

15. A network node configured to operate in a wireless communication network in which user-specific sequences allocable by the network from a finite set of user-specific sequences are used for physical-layer differentiation of individual radio connections with respective wireless nodes, said network node comprising:

a communication interface configured for exchanging signaling with one or more radio network nodes in the network for transferring user-specific sequences between respective service areas of the network; and a processing circuit operatively associated with the communication interface and configured to:

borrow a first user-specific sequence that is associated with a neighboring service area in the network;

assign the first user-specific sequence to a first wireless node for use in the first service area by the first wireless node in generating a user-specific uplink reference signal; and perform at least one of the following operations:

subsequently assign a second user-specific sequence to the first wireless node, for use by the first wireless node in the first service area instead of the first user-specific sequence, wherein the second user-specific sequence is associated with the first service area;

and lend, subject to any lending restrictions imposed on the first user-specific sequence and in response to movement of the first wireless node from the first service area to a further service area, the first user-specific sequence to the further service area, for use by the first wireless node in the further service area.

16. The network node of claim 15, wherein the processing circuit is configured to subsequently assign the second user-specific sequence to the first wireless node based on changing the first wireless node from the first user-specific sequence to the second user-specific sequence within a time limit specified for borrowed usage of the first user-specific sequence.

17. The network node of claim 15, wherein the processing circuit is configured to lend the first user-specific sequence to the further service area, based on being configured to perform at least one of the following operations:

indicate to the network node of the further service area at least one of a geographic restriction and a temporal restriction limiting use of the first user-specific sequence in the further service area; and indicate to the network node in the neighboring service area that the first user-specific sequence is being lent for use in the further service area.

18. A method of managing radio identities in a wireless communication network in which user-specific sequences allocable by the network from a finite set of user-specific sequences are used for physical-layer differentiation of individual radio connections with respective wireless nodes, said method comprising:

associating respective subsets of the user-specific sequences with respective service areas among a plurality of service areas of the network;

within any given first service area among the plurality of service areas, assigning user-specific sequences, as needed, from the subset of user-specific sequences associated with the first service area, for use in the first service area by respective wireless nodes in generating user-specific uplink reference signals;

with respect to an incoming wireless node incoming to the first service area from a second service area and having a current user-specific sequence assigned from the subset of user-specific sequences associated with the second service area:

borrowing, in conjunction with the incoming wireless device moving from the second service area to the first service area, the current user-specific sequence, as a borrowed user-specific sequence, for use in the first service area by the incoming wireless device; and subsequently terminating use of the borrowed user-specific sequence and assigning to the incoming wireless node a user-specific sequence taken from the subset associated with the first service area, so as to return the borrowed user-specific sequence for use in the second service area; and with respect to an outgoing wireless node outgoing from the first service area to a third service area and having a current user-specific sequence assigned from the subset of user-specific sequences associated with the first service area:

lending, in conjunction with the outgoing wireless device moving from the first service area to the third service area, the current user-specific sequence, as a lent user-specific sequence, for use in the third service area by the outgoing wireless device; and deferring new assignments of the lent user-specific sequence within the first service area during a lending period associated with the lent user-specific sequence.

19. A network node configured to operate in a wireless communication network in which user-specific sequences allocable by the network from a finite set of user-specific sequences are used for physical-layer differentiation of individual radio connections with respective wireless nodes, said network node comprising:

a communication interface configured for exchanging signaling with one or more radio network nodes in the network for transferring user-specific sequences between respective service areas of the network; and a processing circuit operatively associated with the communication interface and configured to:

assign a first user-specific sequence that is associated with a first service area in the network to a first wireless node for use in the first service area by the first wireless node in generating a user-specific uplink reference signal;

transfer, in conjunction with the first wireless node moving from the first service area to a second service area, use of the first user-specific sequence from the first service area to a second service area, so as to enable the first wireless node to use the same user-specific uplink reference signal in the second service area; and defer any new use of the first user-specific sequence within the first service area until termination of a lending period governing the transfer of the first user-specific sequence.

20. The network node of claim 19, wherein the processing circuit is configured to assign the first user-specific sequence from a subset of the finite set of user-specific sequences that is associated with the first service area.

21. The network node of claim 20, wherein the associated subset of user-specific sequences is one among a number of respective subsets, each such subset being associated with a different service area within the network.

22. The network node of claim 19, wherein the network node comprises a first radio network node associated with the first service area, and wherein the processing circuit is configured to transfer the first user-specific sequence by sending lending signaling to a second radio network node associated with the second service area, said lending signaling including an indication of the first user-specific sequence.

23. The network node of claim 22, wherein the processing circuit is configured to indicate in said lending signaling one or more limitations restricting at least one of: how long the first user-specific sequence may be used in the second service area for the first wireless node; and whether or to what extent the first user-specific sequence can be transferred from the second service area for continued use of the first user-specific sequence for the first wireless node in a further service area.

24. The network node of claim 19, wherein, with respect to a second wireless node, the processing circuit is configured to:

borrow a second user-specific sequence that is associated with a neighboring service area in the network; and assign the second user-specific sequence to a second wireless node for use in the first service area by the second wireless node in generating a user-specific uplink reference signal.

25. The network node of claim 24, wherein the network node comprises a first radio network node associated with the first service area, and the processing circuit is configured to:

borrow the second user-specific sequence responsive to determining that no user-specific sequences are currently available in the first service area for assignment to the second wireless node, based on sending a borrowing request to a second radio network node associated with the neighboring service area; and receive return signaling indicating the second user-specific sequence.

26. The network node of claim 25, wherein the processing circuit is configured to:

determine from information included in the return signaling at least one of: how long the second user-specific sequence may be used in the first service area for the second wireless node; and whether or to what extent the second user-specific sequence can be transferred from the first service area for continued use of the second user-specific sequence by the second wireless node in a further service area; and limit use of the second user-specific sequence by the second wireless node, in accordance with the information included in the return signaling.

27. The network node of claim 19, wherein the first radio identity comprises a demodulation modulation reference signal, DMRS.

28. The network node of claim 19, wherein the network node comprises a first radio network node associated with the first service area and the processing circuit is configured to send signaling to the first wireless node from the first radio network node, said signaling including at least one of: an indication that the radio connection with the first wireless node is being transferred from the first service area to the second service area, and an indication to reset radio channel filtering in use at the first wireless node, for receiving on the radio connection.

29. The network node of claim 19, wherein the network node comprises a first radio network node associated with the first service area, and wherein the processing circuit is configured to:

receive an indication at the first radio network node that another user-specific sequence, referred to as a transferred user-specific sequence, is being transferred for continued use by a wireless node that is incoming to the first service area from a neighboring service area; and differentiate the radio connection with the incoming wireless node in the first service area based on the transferred user-specific sequence.

30. A method of operation at a wireless node configured for operation in a wireless communication network, said method comprising:

determining a first user-specific sequence assigned by the network to the wireless node;

using the first user-specific sequence for generating a user-specific uplink reference signal for physical differentiation of a radio connection between the wireless node and the network, said radio connection being supported by a first service area of the network;

receiving signaling from the network indicating that the radio connection is being moved to a second service area of the network; and continuing to use the first user-specific sequence for generating the same user-specific reference signal in the second service area.

31. The method of claim 30, further comprising, in response to said signaling from the network, resetting a radio channel filter used by the wireless node for receiving on the radio connection.

32. A wireless node configured for operation in a wireless communication network, said wireless node comprising:

a communication interface configured for radio communications with the network; and a processing circuit that is operatively associated with the communication interface and configured to:

determine a first user-specific sequence assigned by the network to the wireless node;

use the first user-specific sequence for generating a user-specific uplink reference signal for differentiation of a radio connection between the wireless node and the network, said radio connection being supported by a first service area of the network;

receive signaling from the network indicating that the radio connection is being moved to a second service area of the network; and continue to use the first user-specific sequence for generation of the same user-specific uplink reference signal in the second service area.

33. The wireless node of claim 32, wherein the processing circuit is further configured to, in response to said signaling from the network, reset a radio channel filter used by the communication interface for receiving on the radio connection.

* * * * *

UNITED STATES PATENT AND TRADEMARK OFFICE

CERTIFICATE OF CORRECTION

PATENT NO. : 9,918,265 B2
APPLICATION NO. : 14/419844
DATED : March 13, 2018
INVENTOR(S) : Eriksson et al.

It is certified that error appears in the above-identified patent and that said Letters Patent is hereby corrected as shown below:

On the Title Page

In Item (72), under “Inventors”, in Column 1, Line 2, delete “Päl” and insert -- Pål --, therefor.

Column 1, under abstract, in the Figure, in Step “706”, Line 2, delete “IDENTIFY” and insert -- IDENTITY --, therefor.

On Page 2, in Item (57), under “ABSTRACT”, in Column 1, Line 2, delete “used” and insert -- used to --, therefor.

In the Drawings

In Fig. 7, Sheet 4 of 10, in Step “706”, in Line 2, delete “IDENTIFY” and insert -- IDENTITY --, therefor.

In Fig. 9, Sheet 7 of 10, delete “

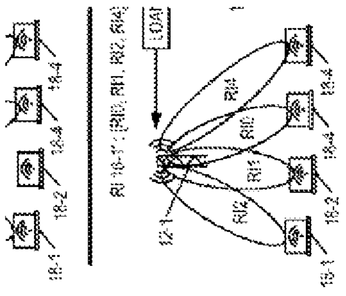

” and insert

Signed and Sealed this
Twenty-second Day of May, 2018

Andrei Iancu
*Director of the United States Patent and Trademark Office*

-- 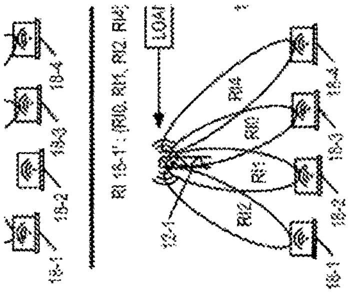 --, therefor.

In the Specification

In Column 2, Line 31, delete “used” and insert -- used to --, therefor.

In Column 5, Line 10, delete “is” and insert -- is a --, therefor.

In the Claims

In Column 17, Line 63, in Claim 7, delete “comprising” and insert -- comprising: --, therefor.

In Column 18, Line 22, in Claim 9, delete “comprises” and insert -- comprises: --, therefor.

In Column 18, Line 23, in Claim 9, delete “demodulation modulation” and insert -- demodulation --, therefor.

In Column 22, Line 8, in Claim 27, delete “comprises” and insert -- comprises: --, therefor.

In Column 22, Line 9, in Claim 27, delete “demodulation modulation” and insert -- demodulation --, therefor.